United States Patent
Takama et al.

(10) Patent No.: US 9,802,386 B2
(45) Date of Patent: Oct. 31, 2017

(54) PRODUCT HAVING PLURALITY OF COMPONENTS FIXED TO EACH OTHER BY ADHESIVE

(71) Applicant: DENSO CORPORATION, Kariya, Aichi-pref. (JP)

(72) Inventors: Daisuke Takama, Nagoya (JP); Kenji Koga, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/672,381

(22) Filed: Mar. 30, 2015

(65) Prior Publication Data

US 2015/0273799 A1 Oct. 1, 2015

(30) Foreign Application Priority Data

Mar. 31, 2014 (JP) .................. 2014-073008

(51) Int. Cl.
*H04N 5/225* (2006.01)
*B32B 7/12* (2006.01)
(Continued)

(52) U.S. Cl.
CPC ............ *B32B 7/12* (2013.01); *B32B 37/1292* (2013.01); *B32B 37/142* (2013.01); *B32B 37/18* (2013.01); *H04N 5/2252* (2013.01); *H04N 5/2257* (2013.01); *B29C 65/16* (2013.01); *B29C 65/4835* (2013.01); *B29C 65/4845* (2013.01);
(Continued)

(58) Field of Classification Search
CPC ............. B29C 66/114; B29C 66/53245; B29C 66/5326; B29C 66/5344; B29C 66/5346; B29C 66/54; B29C 65/4845; B29C 65/16; B29C 65/4835; B29C 66/7212; B29C 65/542; B29C 66/112; B32B 2551/00; B32B 7/12; B32B 37/1292; B32B 37/142; B32B 37/18; Y10T 428/24752; H04N 5/2257; H04N 5/2252; B29L 2031/737; B29L 2031/764

See application file for complete search history.

(56) References Cited

U.S. PATENT DOCUMENTS

2005/0190283 A1* 9/2005 Ish-Shalom .......... H04N 5/2254
                                                                      348/340
2007/0121222 A1* 5/2007 Watanabe .............. G02B 7/021
                                                                      359/811
(Continued)

FOREIGN PATENT DOCUMENTS

JP          S61-249010 A      11/1986
JP          H06-285018 A      10/1994
(Continued)

*Primary Examiner* — Albert Cutler
(74) *Attorney, Agent, or Firm* — Harness, Dickey & Pierce, P.L.C.

(57) ABSTRACT

A product includes a first component, a second component and an adhesive. The adhesive fills an interior space that is surrounded by the first component and the second component. The second component comprising an inlet that communicates between an exterior space of the second component and the interior space so as to enable the adhesive to be injected into the interior space. The inlet comprising a tapered portion that narrows from the exterior space towards the interior space.

13 Claims, 9 Drawing Sheets

(51) Int. Cl.
*B32B 37/14* (2006.01)
*B32B 37/18* (2006.01)
*B29C 65/48* (2006.01)
*B29C 65/16* (2006.01)
*B29C 65/00* (2006.01)
*B29C 65/54* (2006.01)
*B32B 37/12* (2006.01)
*B29L 31/00* (2006.01)

(52) U.S. Cl.
CPC .......... *B29C 65/542* (2013.01); *B29C 66/112* (2013.01); *B29C 66/114* (2013.01); *B29C 66/5326* (2013.01); *B29C 66/5344* (2013.01); *B29C 66/5346* (2013.01); *B29C 66/53245* (2013.01); *B29C 66/54* (2013.01); *B29C 66/7212* (2013.01); *B29L 2031/737* (2013.01); *B29L 2031/764* (2013.01); *B32B 2551/00* (2013.01); *Y10T 428/24752* (2015.01)

(56) References Cited

U.S. PATENT DOCUMENTS

| | | | | |
|---|---|---|---|---|
| 2008/0055754 A1* | 3/2008 | Sakamoto | ............ | G02B 7/026 359/830 |
| 2009/0244726 A1* | 10/2009 | Sakai | ............ | G02B 7/025 359/819 |
| 2010/0302658 A1* | 12/2010 | Watanabe | ............ | B29C 70/682 359/826 |
| 2011/0013901 A1* | 1/2011 | Utsugi | ............ | G02B 7/026 396/529 |
| 2011/0216195 A1 | 9/2011 | Tanaka et al. | | |
| 2011/0234803 A1 | 9/2011 | Nakajima et al. | | |
| 2012/0297800 A1* | 11/2012 | Debus | ............ | F25B 1/00 62/115 |
| 2013/0215185 A1* | 8/2013 | Nystrom | ............ | B41J 2/161 347/20 |
| 2015/0212291 A1* | 7/2015 | Lee | ............ | G02B 7/08 348/360 |
| 2015/0316742 A1* | 11/2015 | Jono | ............ | A61B 1/00096 348/76 |
| 2017/0160492 A1* | 6/2017 | Lin | ............ | G02B 6/3861 |

FOREIGN PATENT DOCUMENTS

| | | |
|---|---|---|
| JP | 2002-006190 A | 1/2002 |
| JP | 2003-185898 A | 7/2003 |
| JP | 2004-126533 A | 4/2004 |
| JP | 2007-155761 A | 6/2007 |
| JP | 2007-237755 A | 9/2007 |
| JP | 2010-052395 A | 3/2010 |
| JP | 2011-188070 | 9/2011 |
| JP | 2011-209417 | 10/2011 |
| JP | 2012-113185 | 6/2012 |

* cited by examiner

PRODUCT HAVING PLURALITY OF COMPONENTS FIXED TO EACH OTHER BY ADHESIVE

CROSS-REFERENCE TO RELATED APPLICATION

This application is based on and claims the benefit of priority from Japanese Patent Application No. 2014-073008, filed Mar. 31, 2014, the disclosure of which is incorporated herein in its entirety by reference.

BACKGROUND

[Technical Field]

The present disclosure relates to a product that has a plurality of components that are fixed to each other by an adhesive.

[Related Art]

Assembly of two components and use of an adhesive to fix the two components to each other during assembly of a product is well-known as described, for example, in JP-A-2012-113185. JP-A-2012-113185 discloses an imaging unit including a lens barrel, an imaging device, a base plate, and fixing members. The lens barrel holds one or more optical elements. The imaging device is disposed on the base plate, and acquires subject images imaged by the optical elements. The fixing members are disposed so as to surround the lens barrel. The lens barrel and the base plate are fixed by the fixing members using an adhesive.

The inventors of the present application have examined using an adhesive to fill a space that is formed between two components as a result of the components being assembled. As a result, the inventors have conceived of a method of forming, in one of the components, an inlet that surrounds a hole that communicates from the exterior into the space, and filling the space with the adhesive from the inlet.

However, based on the examination conducted by the inventors, the above-described method has problems such as the following. When products are mass-produced, filling with adhesive is generally automatically performed for each product. In this case, the amount of adhesive that fills the space from an adhesive dispenser is ordinarily controlled to a fixed amount. However, even when such control is performed, variations occur in the supplied amount of adhesive for filling. In addition, variations also unavoidably occur in the space surrounded by two components because of the tolerance for each product.

To firmly fix the two components, it is preferable that the space is filled with the adhesive in as many products as possible. However, when the supplied amount of adhesive is controlled to do so, the supplied amount of adhesive is excessive in some products, and the adhesive overflows from the inlet to the exterior. When the adhesive overflows from the inlet to the exterior, problems occur in that the appearance of the product becomes unattractive and the like.

SUMMARY

It is thus desired to reduce the possibility of an adhesive overflowing from an inlet into an exterior space, in a technique for filling, with an adhesive from an inlet, a space that is formed between two components as a result of the components being assembled.

A first exemplary embodiment provides a product that includes: a first component; a second component; and an adhesive that fills an interior space that is surrounded by the first component and the second component. The second component includes an inlet that communicates between an exterior space of the second component and the interior space so as to enable the adhesive to be injected into the interior space. The inlet includes a tapered portion that narrows from the exterior space towards the interior space.

A second exemplary embodiment provides a method for producing a product by assembling a plurality of components. The method includes: providing, as the plurality of components, a first component and a second component, the second component having an inlet that communicates between an exterior space of the second component and an interior space surrounded by the first component and the second component, the inlet comprising a tapered portion that narrows from the exterior space towards the interior space; injecting an adhesive from the inlet via the tapered portion into the interior space so as to fill the interior space with the adhesive; and fixing the first component and the second component by the adhesive.

A third exemplary embodiment provides an imaging apparatus that includes a housing and a camera module mounted in the housing. The camera module includes: a barrel, in which an optical system for capturing images is disposed; a holder that houses the barrel; and an adhesive that fills an interior space that is surrounded by the barrel and the holder. The holder includes an inlet that communicates between an exterior space of the holder and the interior space so as to enable the adhesive to be injected into the interior space. The inlet includes a tapered portion that narrows from the exterior space towards the interior space.

In this way, the inlet has the tapered portion that narrows from the exterior space towards the interior space. Therefore, even should the supplied amount of adhesive from an adhesive dispenser be excessive, the amount of excess adhesive that the tapered portion is able to receive increases. Therefore, the possibility of the adhesive overflowing outside of the inlet (in other words, to the exterior space) is reduced.

DESCRIPTION OF EMBODIMENTS

An embodiment of the present disclosure will hereinafter be described with reference to FIGS. 1 to 15. An imaging apparatus 1 according to the present embodiment is mounted in a vehicle. The imaging apparatus 1 captures images of an area ahead of the vehicle and performs various analysis processes (such as an image recognition process) using the images acquired as a result of imaging. The imaging apparatus 1 then outputs signals of the results to other electronic control units (ECU) (such as a headlight control ECU or a vehicle lane deviation detection ECU) in the vehicle.

Figure 1:
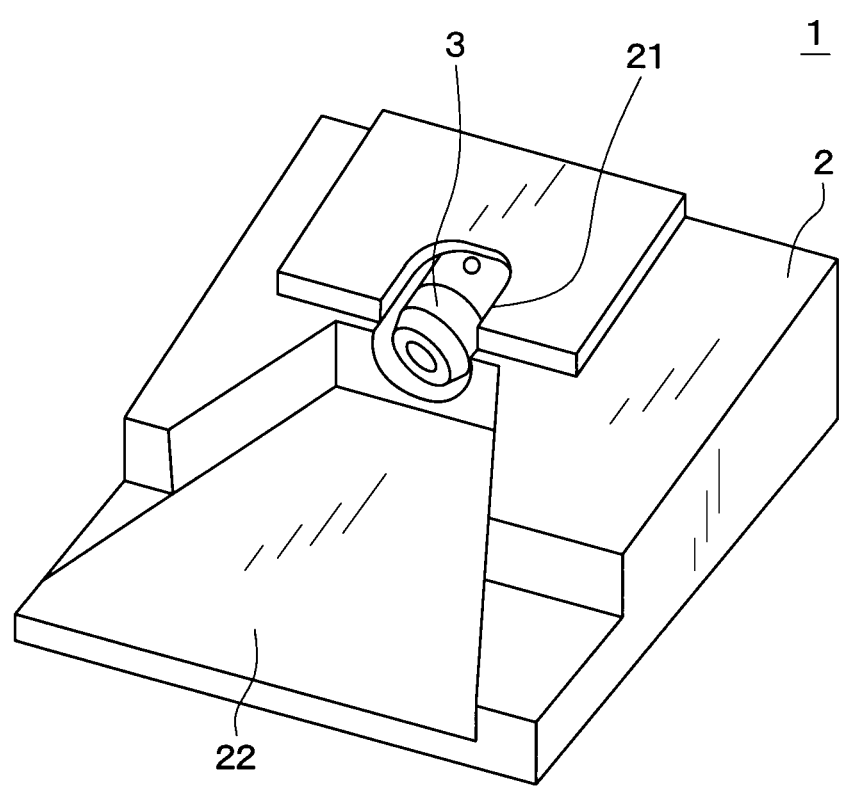
FIG. 1 is a perspective view of an imaging apparatus according to an embodiment of the present disclosure.

As shown in FIG. 1, the imaging apparatus 1 has a housing 2 and a camera module 3. The camera module 3 is partially exposed from an opening 21 that is formed near a center portion on a top surface of the housing 2. The camera module 3 is a section that captures images of an area ahead of the vehicle. The imaging apparatus 1 is attached to a portion of a windshield (or in other words, the front glass) positioned near the rear view mirror within the vehicle cabin.

Figure 2:
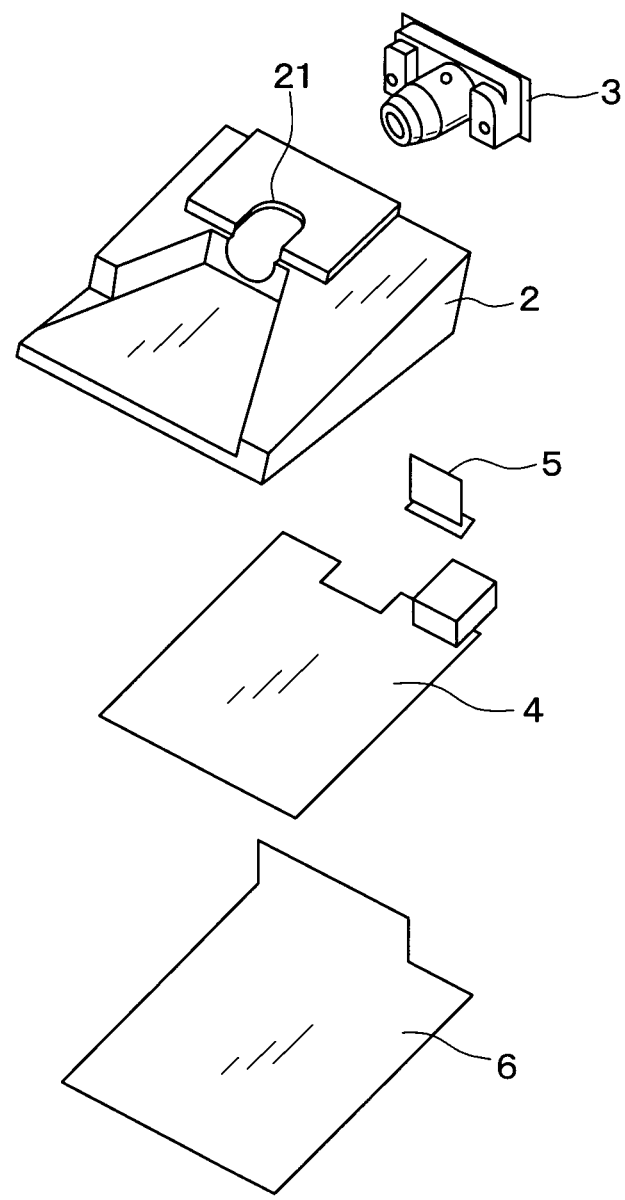
FIG. 2 is a development view of components of the imaging apparatus.

Here, the configuration of the imaging apparatus 1 will be described in further detail. As shown in FIG. 2, the imaging apparatus 1 includes the housing 2, the camera module 3, a control board 4, electrical connection wiring 5, and a lower cover 6.

As described above, the opening 21 that connects the interior and the exterior of the housing 2 is formed near the center of the top surface of the housing 2, which is composed of metal. The imaging apparatus 1 is configured so that the camera module 3 is mounted in the housing 2 so as to be partially exposed from the opening 21. The control board 4 and the electrical connection wiring 5 are disposed below the camera module 3. The lower cover 6 is fixed to the housing 2 further below the control board 4 and the electrical connection wiring 5. The position of the opening 21 in the housing 2 opposes the control board 4.

A depression 22 is formed so that the housing 2 does not block the imaging area of the camera module 3. In addition, the opening 21 is formed so as not to block the imaging area of the camera module 3.

Here, the configuration of the camera module 3 will be described with reference to FIGS. 3 to 8. The camera module 3 has a barrel 31, a holder 32, and a camera board 33.

The barrel 31 is a substantially cylindrical, resin component, inside of which an optical system used for capturing the images of the area ahead of the vehicle is disposed. Specifically, lenses 35a to 35d for imaging and spacers 36a to 36d for positioning the lenses 35a to 35d are disposed inside the barrel 31.

More specifically, the barrel 31 has a tip portion 31a, a body portion 31b, a first flange portion 31c, a second flange portion 31d, and a third flange portion 31e. The tip portion 31a is a tubular member of which the outer diameter decreases towards the tip direction (leftward direction in FIG. 7). The body portion 31b is a substantially cylindrical member of which the inner diameter and the outer diameter are substantially fixed. The tip (left end portion in FIG. 7) of the body portion 31b is fitted into and bonded to the tail portion of the tip portion 31a. The tip portion 31a and the body portion 31b are coaxially arranged with an optical axis 310 as the axis.

The first flange portion 31c, the second flange portion 31d, and the third flange portion 31e are each a circular disk-shaped flange member that has a hole. The first flange portion 31c, the second flange portion 31d, and the third flange portion 31e are perpendicularly erected on the outer circumferential surface of the body portion 31b so as to surround the outer circumference of the body portion 31b.

The holder 32 is a member that houses the barrel 31 and to which the camera board 33 is fixed by screws. The holder 32 is mainly composed of resin, but also contains carbon for light-blocking purposes. Because the holder 32 contains carbon, the temperature of the holder 32 rapidly increases due to absorption when a laser light for curing an adhesive, described hereafter, is irradiated on the holder 32. As a result, the possibility of the holder 32 becoming damaged increases.

The holder 32 has a holder base portion 32a and a holder tube portion 32b. The camera board 33 is fixed to the holder base portion 32a by screws. The holder tube portion 32b, which has a substantially cylindrical shape, extends from the holder base portion 32a in the direction of the optical axis 310, and houses the barrel 31. The holder base portion 32a and the holder tube portion 32b are integrally formed.

Figure 3:
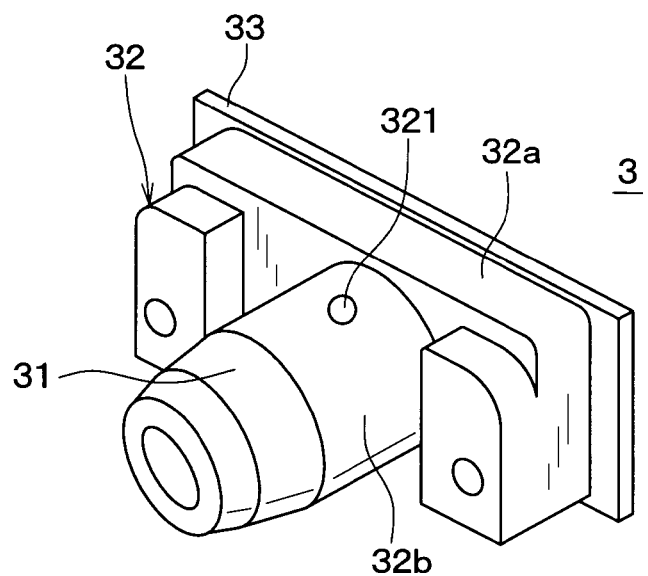
FIG. 3 is a perspective view of a camera module.
Figure 4:
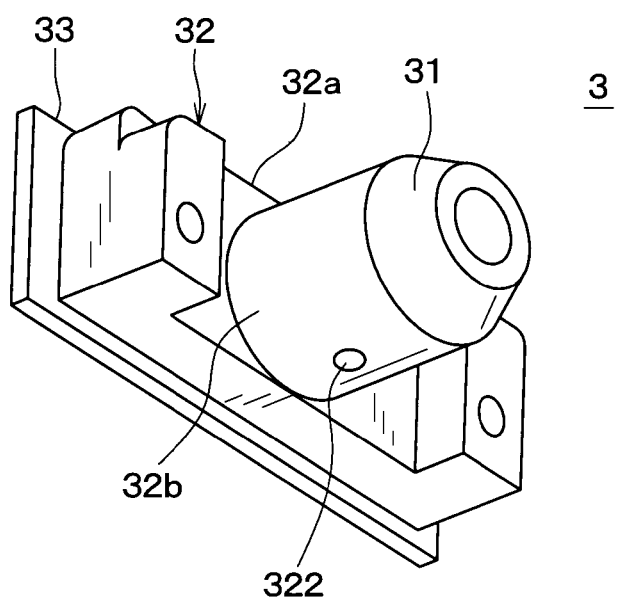
FIG. 4 is a perspective view of the camera module.
Figure 5:
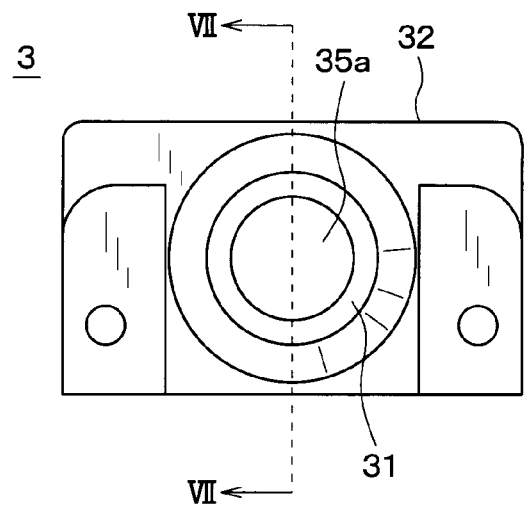
FIG. 5 is a front view of the camera module.
Figure 6:
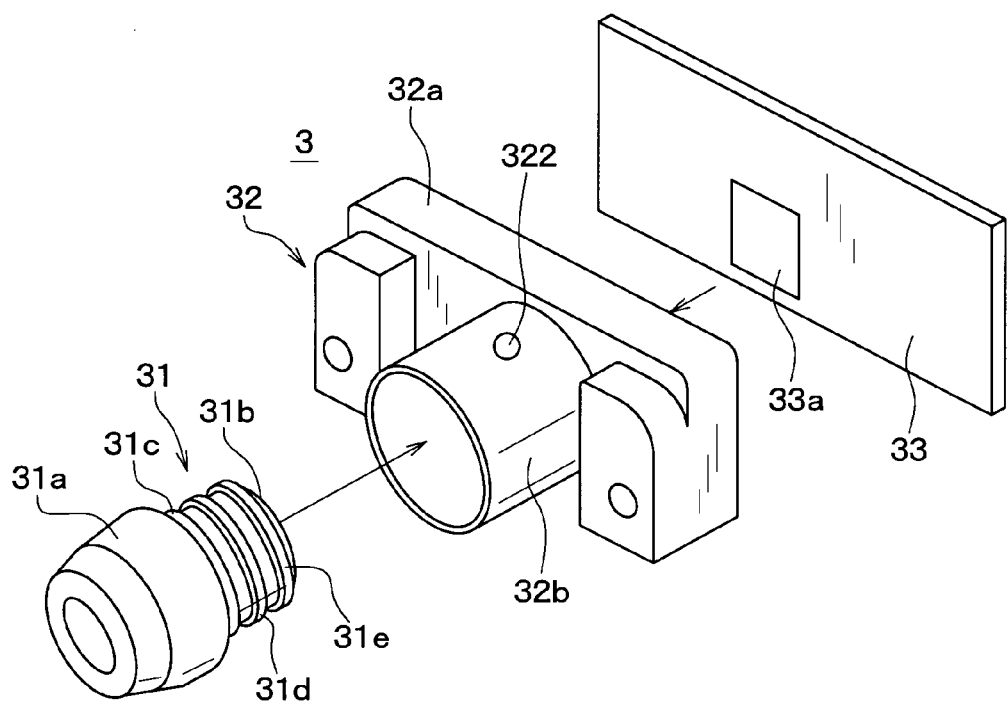
FIG. 6 is a development view of the components of the camera module.
Figure 7:
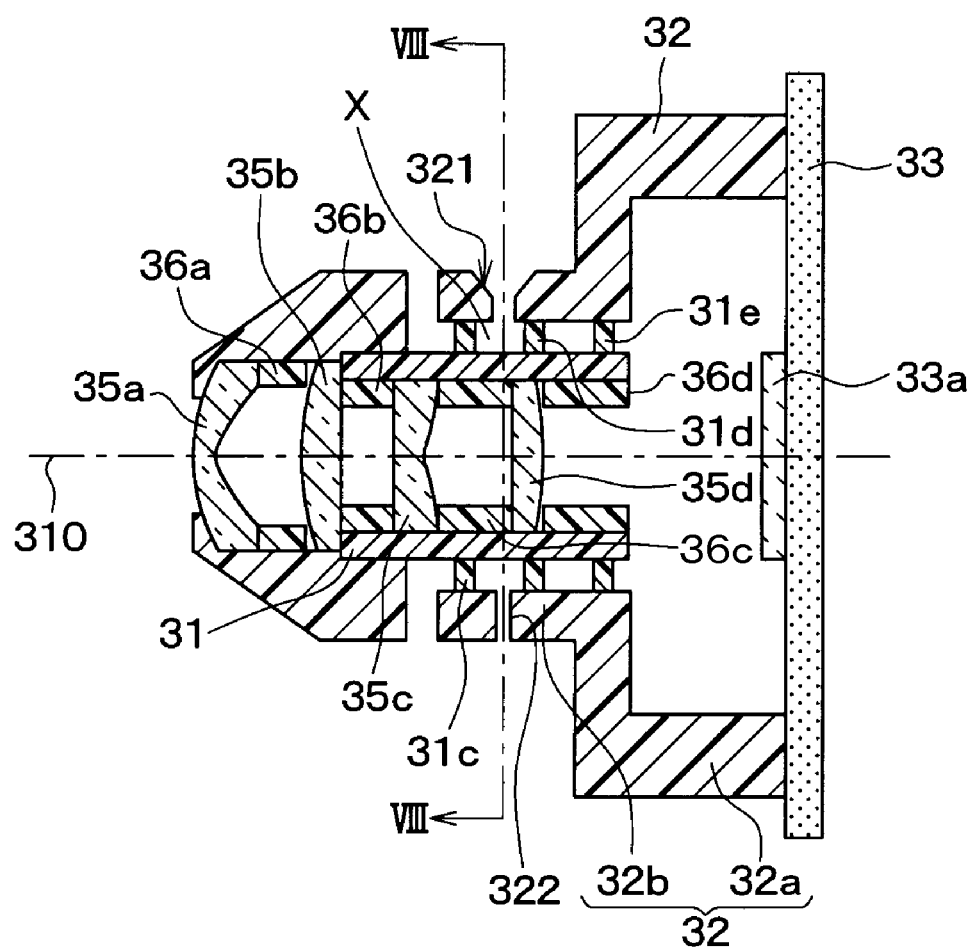
FIG. 7 is a cross-sectional view taken along VII-VII in FIG. 5.

In addition, as shown in FIG. 3, an inlet 321 that surrounds an adhesive injection hole is formed on the upper side of the holder tube portion 32b. Furthermore, as shown in FIG. 4, an air outlet 322 that surrounds an air hole is formed on the lower side of the holder tube portion 32b. As shown in FIG. 7, the inlet 321 and the air outlet 322 are provided in opposing positions with the optical axis 310 therebetween. More specifically, the air outlet 322 communicates to a position within an interior space X that is the farthest from the inlet 321.

The camera board 33 is a circuit board on which a solid-state image sensing device 33a (such as a complementary metal-oxide-semiconductor (CMOS) image sensor) for acquiring the captured images of the area ahead of the vehicle is mounted. The camera board 33 is fixed to the rear surface of the holder 32. In a state in which the barrel 31 is fixed to the holder 32 and the camera board 33 is fixed to the holder 32, the solid-state image sensor device 33a is disposed on the common optical axis 310 of the lenses 35a to 35d inside the barrel 31.

As a result, the light collected by the lenses 35a to 35d forms an image on the solid-state image sensing device 33a, and the solid-state image sensing device 33a output a signal based on the image. The opening 21 in the housing 2 is positioned so as to oppose the camera board 33.

The electrical connection wiring 5, shown in FIG. 2, is wiring (such as a flexible printed board) that connects the solid-state image sensing device 33a and other circuits on the camera board 33 to the circuits mounted on the control board 4. The circuits mounted on the control board 4 include a detecting unit that performs the above-described analysis processes and the like.

Here, a method of assembling and fixing the barrel 31 and the holder 32 will be described. First, at a first step, an operator inserts the barrel 31 into the holder tube portion 32b of the holder 32. In this state, the first flange portion 31c, the second flange portion 31d, and the third flange portion 31e are in contact with the overall circumference of the inner wall of the holder tube portion 32b, as shown in FIG. 7.

As a result, the surface of the first flange portion 31c on the second flange portion 31d side, the surface of the second flange portion 31d on the first flange portion 31c side, the surface of the outer circumferential surface of the body portion 31b between the first flange portion 31c and the second flange portion 31d, the surface of the inner wall surface of the holder tube portion 32b between the first flange portion 31c and the second flange portion 31d surround the interior space X.

Figure 8:
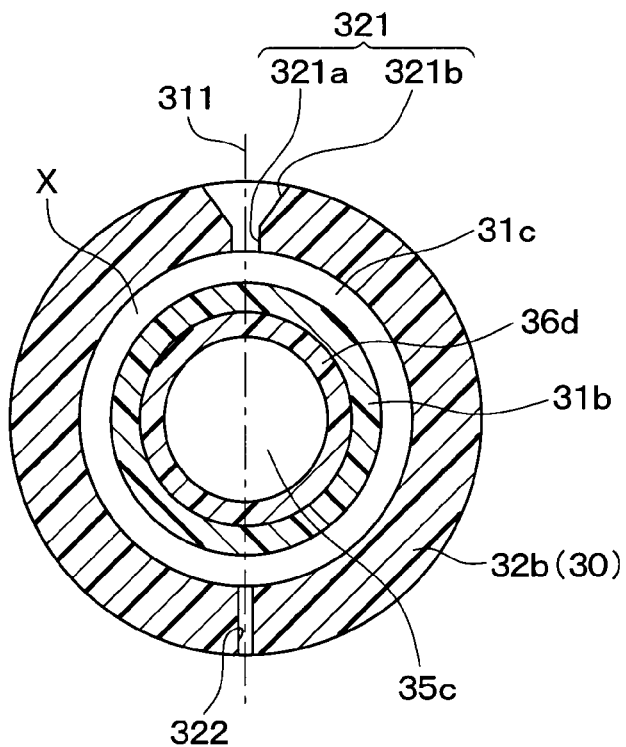
FIG. 8 is a cross-sectional view taken along VIII-VIII in FIG. 7.

As shown in FIG. 8, the interior space X is ring-shaped (annular). To fill the ring-shaped interior space X, such as this, with an adhesive and fix the body portion 31b and the holder tube portion 32b to each other, the inlet 321 that communicates between the interior space X and the exterior space is preferably formed so as not be too large in relation to the interior space X.

As shown in FIG. 7 and FIG. 8, the above-described inlet 321 and air outlet 322 are formed in portions of the holder tube portion 32b that surround the interior space X. The interior space X communicates with the space outside of the camera module 3 only through the inlet 321 and the air outlet 322.

Here, the shapes of the inlet 321 and the air outlet 322 will be described. The inlet 321 is an opening that communicates between the exterior space and the interior space X to enable the adhesive, described hereafter, to be injected into the interior space X.

As shown in FIG. 8, the shape of the inlet 321 is composed of two different portions: a nozzle receiving portion 321a disposed on the interior space X side, and a tapered portion 321b disposed on the side of the external space of the camera module 3 (more specifically, the external space of the holder 32).

The nozzle receiving portion 321a has a fixed inner diameter and extends from the end of the inlet 321 on the interior space X side in the direction towards the exterior space side. Therefore, the diameter of the nozzle receiving portion 321a does not change from the exterior space towards the interior space X. The inner diameter of the nozzle receiving portion 321a is the same as, or slightly larger than, the outer diameter of an adhesive injection nozzle 7, described hereafter. For example, the inner diameter of the nozzle receiving portion 321a is no less than 0.95 times and no more than 1.0 times the outer diameter of the adhesive injection nozzle 7.

The tapered portion 321b extends from the end of the inlet 321 on the exterior space side towards the interior space X and connects to the end portion of the nozzle receiving portion 321a on the exterior space side. The tapered portion 321b has a basin-like shape that opens into the exterior space. More specifically, the tapered portion 321b becomes narrower from the exterior space of the camera module 3 towards the interior space X. In other words, the tapered portion 321b becomes smaller in diameter from the exterior space of the camera module 3 towards the interior space X.

When a virtual line 311 that is perpendicular to the optical axis 310 and passes through the center of the adhesive injection hole is set, all cross-sections of the nozzle receiving portion 321a and the tapered portion 321b that are perpendicular to the virtual line 311 have a circular shape. In addition, the height of the nozzle receiving unit 321a in the direction of the virtual line 311 is, for example, half of the height of the tapered portion 321b in the direction of the virtual line 311.

The air outlet 322 is provided to enable the air within the interior space X to be discharged when the adhesive, described hereafter, fills the interior space X. The air outlet 322 communicates between the interior space X and the exterior space, and has an inner diameter that is fixed and smaller than the inner diameter of the nozzle receiving portion 321a. The air outlet 322 is formed coaxially with the inlet 321, and all cross-sections of air outlet 322 that are perpendicular to the virtual line 311 have a circular shape.

Figure 9:
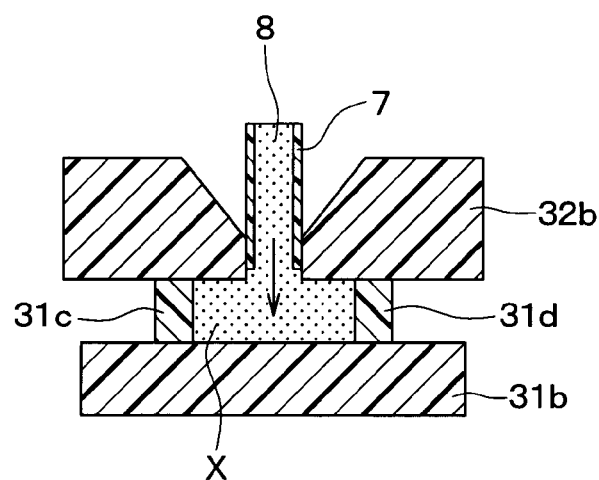
FIG. 9 is a diagram of a step of injecting an adhesive into an interior space.

Next, as shown in FIG. 9, at a second step, the operator inserts the tip of the adhesive injection nozzle 7 of the adhesive dispenser into the nozzle receiving portion 321a and ejects the adhesive 8 from the adhesive injection nozzle 7. Then, the adhesive 8 is supplied from the nozzle receiving portion 321a to the interior space X.

The adhesive 8 is a thermosetting adhesive that is cured by being heated and has translucent properties (in other words, is transparent or semitransparent). For example, the adhesive 8 is an epoxy resin that contains a permeable filler.

The outer shape of the tip portion of the adhesive injection nozzle 7 has the same shape as the nozzle receiving portion 321, or in other words, has a cylindrical shape that does not change in diameter. Therefore, the section in which the adhesive injection nozzle 7 and the nozzle receiving portion 321a are in contact with substantially no gaps therebetween is wide. The possibility of the adhesive 8 leaking into the exterior space from a gap (spigot joint portion) between the adhesive injection nozzle 7 and the nozzle receiving portion 321a is reduced.

In addition, because the air outlet 322 communicates between the interior space X and the exterior space, the adhesive 8 flows into the interior space X, and the air is discharge from the interior space X to the exterior space through the air outlet 322. Therefore, the possibility of the air within the interior space X inhibiting the flow of the adhesive 8 is reduced. Furthermore, because the air outlet 322 communicates in a position within the interior space X that is farthest from the inlet 321, the air-discharging function is maintained until the end, or in other words, until filling with the adhesive 8 is completed.

According to the present embodiment, the imaging apparatuses 1 are mass-produced, and the camera module 3 of each of the mass-produced imaging apparatuses 1 is assembled and fixed by the same method. During assembly and fixing, the supplied amount of adhesive 8 ejected from the adhesive injection nozzle 7 is controlled so as to be the same. However, even in this case, the supplied amount from the adhesive injection nozzle 7 varies with each imaging apparatus 1 (corresponding to an example of a product). In addition, variations unavoidably occur in the interior spaces X as a result of the tolerance for each imaging apparatus 1.

To firmly fix the barrel 31 and the holder 32, it is desirable that the interior space X is filled with the adhesive 8 in as many imaging apparatuses 1 as possible. However, when the supplied amount of adhesive 8 is controlled to do so, the supplied amount of adhesive 8 may be excessive in some imaging apparatuses 1, and the adhesive 8 may overflow from the interior space X to the inlet 321.

Figure 10:
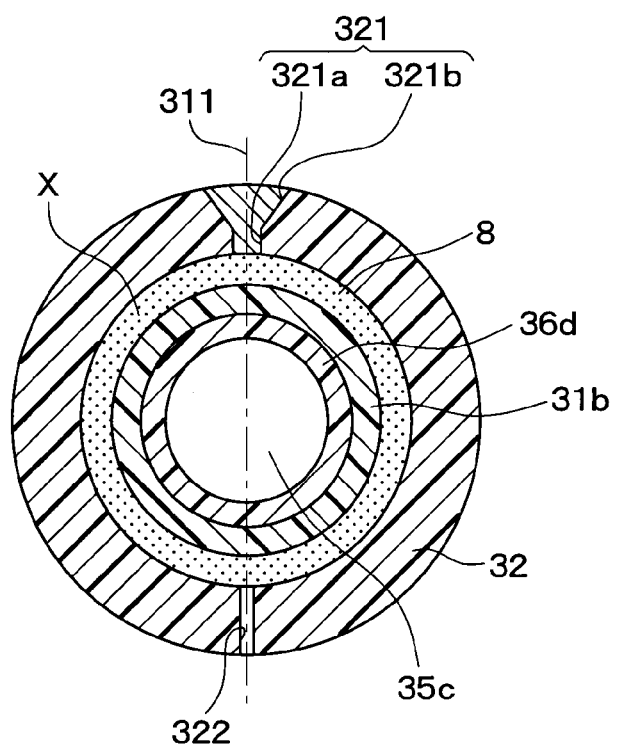
FIG. 10 is a diagram of a state in which the adhesive fills the interior space.
Figure 11:
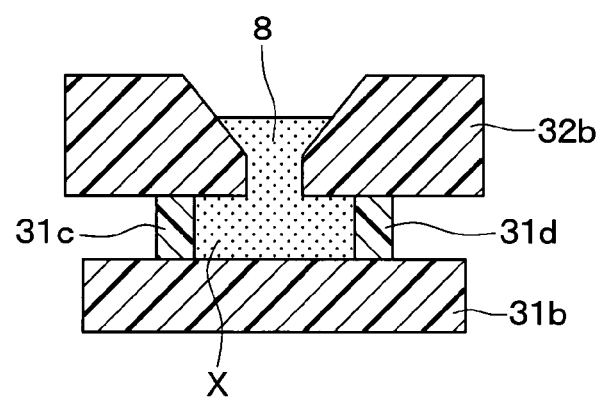
FIG. 11 is a diagram of a state in which the adhesive fills the interior space.

In such cases as well, when the inlet 321 has the tapered portion 321b as described above, even should the supplied amount of adhesive 8 be excessive, the amount of excess adhesive 8 that the tapered portion 321 is able to receive increases, as shown in FIG. 10 and FIG. 11. Therefore, the possibility of the adhesive 8 overflowing outside of the inlet 321 (in other words, to the exterior space) is reduced. Moreover, the frequency at which problems, such as the appearance of the imaging apparatus 1 becoming unattractive, occur can be reduced.

Figure 12:
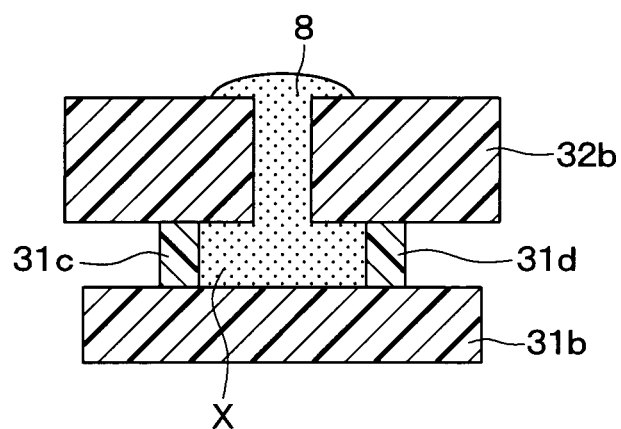
FIG. 12 is a diagram of a comparison example.

Should the inlet 321 not have the tapered portion 321b, and should the diameter from the end portion on the interior space X side to the end portion on the exterior space side not change, as shown in FIG. 12, the amount of excess adhesive 8 in the supplied amount that can be received decreases. The possibility of the adhesive 8 overflowing outside of the inlet 321 then increases.

Figure 13:
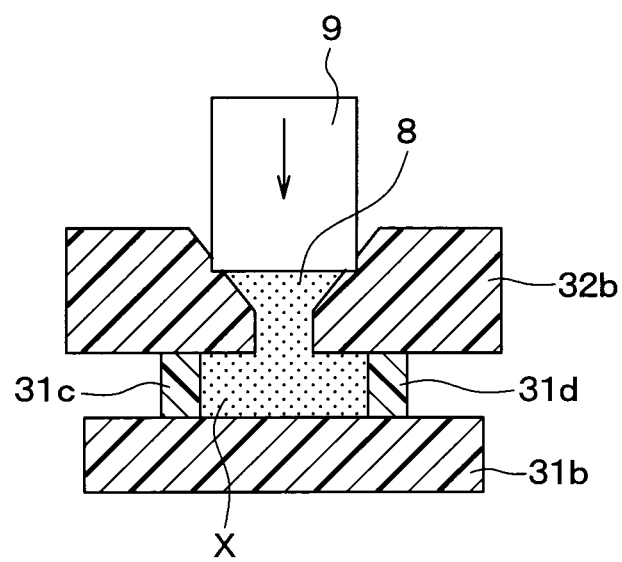
FIG. 13 is a diagram of a state in which the adhesive fills the interior space.

Next, at a third step, the operator irradiates laser light 9 onto the adhesive 8 from the inlet 321 for temporary fixing, as shown in FIG. 13. As a result of the laser light 9 being irradiated onto the adhesive 8 near the inlet 321 in this way, the portion of the adhesive 8 that receives the irradiation is heated and cured. As a result, the barrel 31 and the holder 32 are fixed to each other near the inlet 321 by the cured adhesive 8.

The diameter of the laser light 9 is larger than the diameter of the nozzle receiving portion 321a so that the laser light 9 passes through the overall hole formed by the nozzle receiving portion 321a, even when the irradiation position of the laser light 9 is slightly misaligned. As a result, even when the irradiation position of the laser light 9 is slightly misaligned, the placement of the portion of the adhesive 8 within the interior space X that is irradiated by the laser light 9 through the hole formed by the nozzle receiving portion 321a is not unbalanced. Therefore, temporary fixing is more firmly performed.

However, when the diameter of the laser light 9 is made larger than the diameter of the nozzle receiving portion 321a, the possibility of the laser light 9 being irradiated on the holder tube portion 32b increases. In this case, because the holder 32 contains carbon as described above, absorption due to irradiation of the laser light 9 onto the holder 32 causes the temperature of the holder 32 to rapidly increase. As a result, the possibility of the holder 32 becoming damaged increases.

Therefore, according to the present embodiment, the diameter of the laser light 9 is made larger than the diameter of the nozzle receiving portion 321a and smaller than the maximum diameter of the tapered portion 321b. As a result, as shown in FIG. 13, the holder tube portion 32b is protected by the adhesive 8 that has spread and is held within the tapered portion 321b. The area over which the laser light 9 irradiates the holder tube portion 32b decreases or becomes zero. Therefore, the possibility of the holder 32 becoming damaged is reduced.

Figure 14:
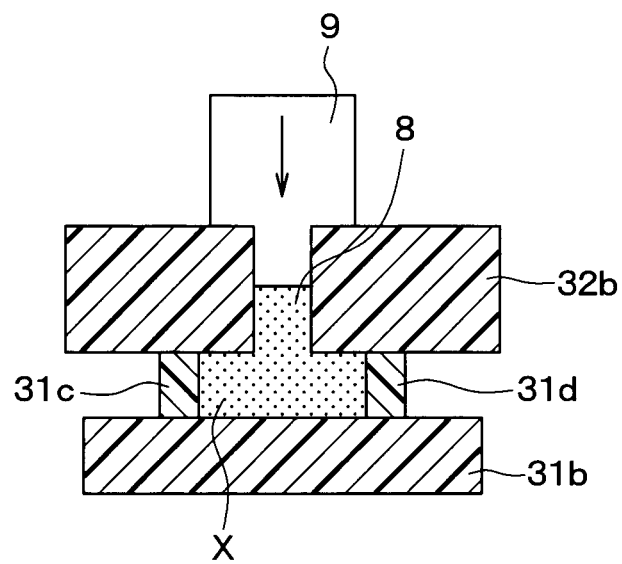
FIG. 14 is a diagram of a comparison example.

Should the inlet 321 not have the tapered portion 321b, and should the diameter from the end portion on the interior space X side to the end portion on the exterior space side not change, as in FIG. 14, the laser light 9 will be irradiated on the holder tube portion 32b without exception. As a result, the possibility of the holder 32 becoming damaged increases.

Next, at a fourth step, the operator gradually heats the camera module 3. As a result, all portions of the adhesive 8 that have not been cured at the third step are cured. As a result, fixing of the barrel 31 and the holder 32 by the adhesive 8 is completed.

Other Embodiments

The present disclosure is not limited to the above-described embodiment and can be modified as appropriate within the scope of claims. In addition, the above-described embodiment is not mutually unrelated and can be combined as appropriate, excluding instances in which combining is clearly not possible. In addition, in the above-described embodiment, it goes without saying that the elements configuring the embodiment are not necessarily requisites, excluding instances in which the element is particularly disclosed as being a requisite, instances in which the element is clearly a requisite on principle, and the like.

Furthermore, in the above-described embodiment, when numerical values, such as quantity, numerical value, amount, or range, of the constituent elements of the embodiment are mentioned, the numerical values are not limited to the specified numbers, excluding instances in which the specific numbers are particularly disclosed as being a requisite, instances in which the numerical value is clearly limited to the specific numbers on principle, and the like.

Moreover, in the above-described embodiment, when the shape, positional relationship, or the like of the constituent element and the like is mentioned, the constituent element is not limited to the shape, positional relationship, or the like, excluding instances in which it is particularly disclosed as such, instances in which the constituent element is limited to the shape, positional relationship, or the like on principle, and the like. For example, the following variation examples are also allowed. The following variation examples can be selectively applied or not applied to the above-described embodiment on an individual basis. In other words, an arbitrary combination of the following variation examples can be applied to the above-described embodiment.

(First Variation Example)

Figure 15:
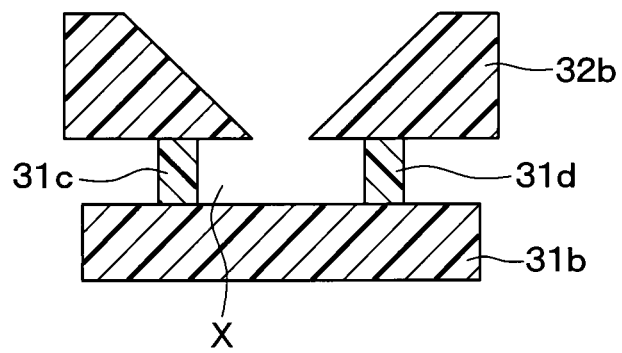
FIG. 15 is a diagram of a variation example of the present disclosure.

According to the above-described embodiment, the inlet 321 has the nozzle receiving portion 321a and the tapered portion 321b. However, the inlet 321 is not necessarily required to have the nozzle receiving portion 321a. For example, as shown in FIG. 15, the inlet 321 may be configured so as to have only the tapered portion 321b.

(Second Variation Example)

According to the above-described embodiment, the nozzle receiving portion 321a of the inlet 321 does not change in diameter from the exterior space towards the interior space X. However, the nozzle receiving portion 321a is not necessarily required to be configured in this way.

For example, the nozzle receiving portion 321a of the inlet 321 may be shaped so as to become narrower from the exterior space towards the interior space X. In this case, the rate of change in the diameter of the nozzle receiving portion 321a along the direction from the exterior space towards the interior space X may be less than the rate of change in the diameter of the tapered portion 321b (in other words, the amount of narrowing may be less).

However, in this case as well, leaking of the adhesive 8 from the spigot joint portion can be reduced if the nozzle receiving portion 321a has the same shape as the outer shape of the adhesive injection nozzle 7. In this case, the adhesive injection nozzle 7 also has the narrowing shape with a rate of change in the diameter similar to that of the inlet 321.

(Third Variation Example)

According to the above-described embodiment, only a single air outlet 322 that communicates between the interior space X and the exterior space is provided. However, a plurality of air outlets 322 may be provided.

(Fourth Variation Example)

According to the above-described embodiment, the inlet 321 and the air outlet 322 are both formed in the holder tube portion 32b. However, the inlet 321 and the air outlet 322 are not necessarily required to be formed in this way. For example, the inlet 321 may be formed in the holder 32, and the air outlet 322 may be formed in the body portion 31b of the barrel 31.

In addition, for example, the inlet 321 and the air outlet 322 may both be formed in the body portion 31b of the barrel 31. In this case, the barrel 31 corresponds to an example of a second component, and the holder 32 corresponds to an example of a first component.

(Fifth Variation Example)

The adhesive 8 is not necessarily required to be a thermosetting type.

What is claimed is:

1. A product comprising:
a first component;
a second component, the first component and the second component being provided so as to surround an interior space; and
an adhesive that fills the interior space that is surrounded by the first component and the second component,
the second component housing the first component,
the interior space being surrounded by an outer peripheral surface of the first component and an inner peripheral surface of the second component,
the second component comprising an inlet that communicates between an exterior space of the second component and the interior space so as to enable the adhesive to be injected into the interior space,
the inlet comprising a tapered portion that narrows from the exterior space towards the interior space and a nozzle receiving portion in which an adhesive injection nozzle is inserted, the adhesive injection nozzle injecting the adhesive into the interior space from the inlet,
the nozzle receiving portion being located closer to the interior space as compared with the tapered portion,
the adhesive, which spreads from the interior space via the nozzle receiving portion up to the tapered portion, being cured by irradiation of a laser light that is irradiated onto the adhesive from the inlet, a diameter of the laser light being larger than a diameter of the nozzle receiving portion and smaller than a maximum diameter of the tapered portion,
the cured adhesive, which fills the tapered portion, being formed into an inverted conical shape,
the first component and the second component being fixed to each other by the cured adhesive.

2. The product according to claim 1, further comprising an air outlet that is formed, separately from the inlet, in the first component or the second component, and communicates between the exterior space and the interior space.

3. The product according to claim 2, wherein
the air outlet communicates to a position within the interior space that is the farthest from the inlet.

4. The product according to claim 3, wherein
the interior space is a ring-shaped space.

5. The product according to claim 4, wherein
the nozzle receiving portion having the same shape as an outer shape of an adhesive injection nozzle that injects the adhesive from the inlet into the interior space.

6. The product according to claim 4, wherein
the nozzle receiving portion has a diameter that does not change from the exterior space towards the interior space.

7. The product according to claim 1, wherein
the interior space is a ring-shaped space.

8. The product according to claim 1, wherein
the nozzle receiving portion has the same shape as an outer shape of an adhesive injection nozzle that injects the adhesive from the inlet into the interior space.

9. The product according to claim 1, wherein
the nozzle receiving portion has a diameter that does not change from the exterior space towards the interior space.

10. The product according to claim 1, wherein:
the product is a camera module configuring an imaging apparatus, the camera module comprising a barrel, in which an optical system for capturing images is disposed, and a holder that houses the barrel;
the first component is one of the barrel and the holder; and
the second component is the other of the barrel and the holder.

11. The product according to claim 1, wherein:
the first component is a barrel that is formed into a cylindrical shape;
the second component is a tube that is formed into a cylindrical shape; and
the barrel is housed in the tube.

12. A method for producing a product by assembling a plurality of components, comprising:
providing, as the plurality of components, a first component and a second component, the second component having an inlet that communicates between an exterior space of the second component and an interior space surrounded by an outer peripheral surface of the first component and an inner peripheral surface of the second component, the inlet comprising a tapered portion that narrows from the exterior space towards the interior space and a nozzle receiving portion in which an adhesive injection nozzle is inserted, the adhesive injection nozzle injecting an adhesive into the interior space from the inlet, the nozzle receiving portion being located closer to the interior space as compared with the tapered portion;
injecting an adhesive from the inlet via the tapered portion into the interior space so as to fill the interior space with the adhesive;
irradiating a laser light onto the adhesive from the inlet and curing the adhesive spreading from the interior space via the nozzle receiving portion up to the tapered portion by irradiation of a laser light, a diameter of the laser light being larger than a diameter of the nozzle receiving portion and smaller than a maximum diameter of the tapered portion, the cured adhesive filling the tapered portion and being formed into an inverted conical shape; and
fixing the first component and the second component by the cured adhesive.

13. An imaging apparatus comprising:
a housing; and
a camera module that is mounted in the housing,
the camera module comprising:
a barrel, in which an optical system for capturing images is disposed;
a holder that houses the barrel; and
an adhesive that fills an interior space that is surrounded by an outer peripheral surface of the barrel and an inner peripheral surface of the holder,
the holder comprising an inlet that communicates between an exterior space of the holder and the interior space so as to enable the adhesive to be injected into the interior space,
the inlet comprising a tapered portion that narrows from the exterior space towards the interior space and a nozzle receiving portion in which an adhesive injection nozzle is inserted, the adhesive injection nozzle injecting the adhesive into the interior space from the inlet,
the nozzle receiving portion being located closer to the interior space as compared with the tapered portion,
the adhesive, which spreads from the interior space via the nozzle receiving portion up to the tapered portion, being cured by irradiation of a laser light that is irradiated onto the adhesive from the inlet, a diameter of the laser light being larger than a diameter of the nozzle receiving portion and smaller than a maximum diameter of the tapered portion,
the cured adhesive, which fills the tapered portion, being formed into an inverted conical shape,
the barrel and the holder being fixed to each other by the adhesive.

\* \* \* \* \*